United States Patent
Horman

(10) Patent No.: US 6,785,706 B1
(45) Date of Patent: Aug. 31, 2004

(54) METHOD AND APPARATUS FOR SIMPLIFIED ADMINISTRATION OF LARGE NUMBERS OF SIMILAR INFORMATION HANDLING SERVERS

(75) Inventor: Randall William Horman, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 09/652,192

(22) Filed: Aug. 31, 2000

(30) Foreign Application Priority Data

Sep. 1, 1999 (CA) .............................................. 2281367

(51) Int. Cl.[7] .............................................. G06F 13/00
(52) U.S. Cl. ........................ 709/203; 709/248; 709/223
(58) Field of Search .............................. 709/200, 201, 709/203, 217, 218, 219, 220, 221, 223, 227, 248

(56) References Cited

U.S. PATENT DOCUMENTS

| | | | | |
|---|---|---|---|---|
| 5,832,225 A | * | 11/1998 | Hacherl et al. | 707/200 |
| 5,857,102 A | * | 1/1999 | McChesney et al. | 395/651 |
| 6,014,669 A | * | 1/2000 | Slaughter et al. | 707/10 |
| 6,128,644 A | * | 10/2000 | Nozaki | 709/203 |
| 6,167,408 A | * | 12/2000 | Cannon et al. | 707/203 |
| 6,256,747 B1 | * | 7/2001 | Inohara et al. | 714/4 |
| 6,330,600 B1 | * | 12/2001 | Matchefts et al. | 709/223 |
| 6,334,178 B1 | * | 12/2001 | Cannon et al. | 712/28 |
| 6,374,295 B2 | * | 4/2002 | Farrow et al. | 709/223 |
| 6,538,668 B1 | * | 3/2003 | Ruberg et al. | 345/747 |
| 6,564,216 B2 | * | 5/2003 | Waters | 707/10 |

OTHER PUBLICATIONS

"Study on Location Management Scheme for Mobile ATM Networks Based on PNNI Standard" by D. Kim, 1999 IEEE Proceedsings on IEEE Region 10 Conference TENCON 99, pp. 19–22, Jun. 1999.
"Resource Location in Mobile ATM Networks" by L. Frelechoux, et al, IEEE Internationsl Conference on ATM, pp. 423–430, Jun. 1998.

* cited by examiner

Primary Examiner—Moustafa M. Meky
(74) Attorney, Agent, or Firm—Douglas W. Cameron; Anne V. Dougherty

(57) ABSTRACT

The invention provides method and apparatus for an improved data processing system having an administrative control server; an administrative control database, connected to said administrative control server; and at least one group of servers having similar, but not necessarily identical, configurations adapted for communication with the administrative control server for administrative control thereby, in which the control server can change the configurations of the administered servers to a new desired configuration for each administered server where the new configuration is in synchronization with the configuration of each of said other administered server, by generating synchronization instructions from parameterized synchronization scripts stored in the control database.

19 Claims, 6 Drawing Sheets

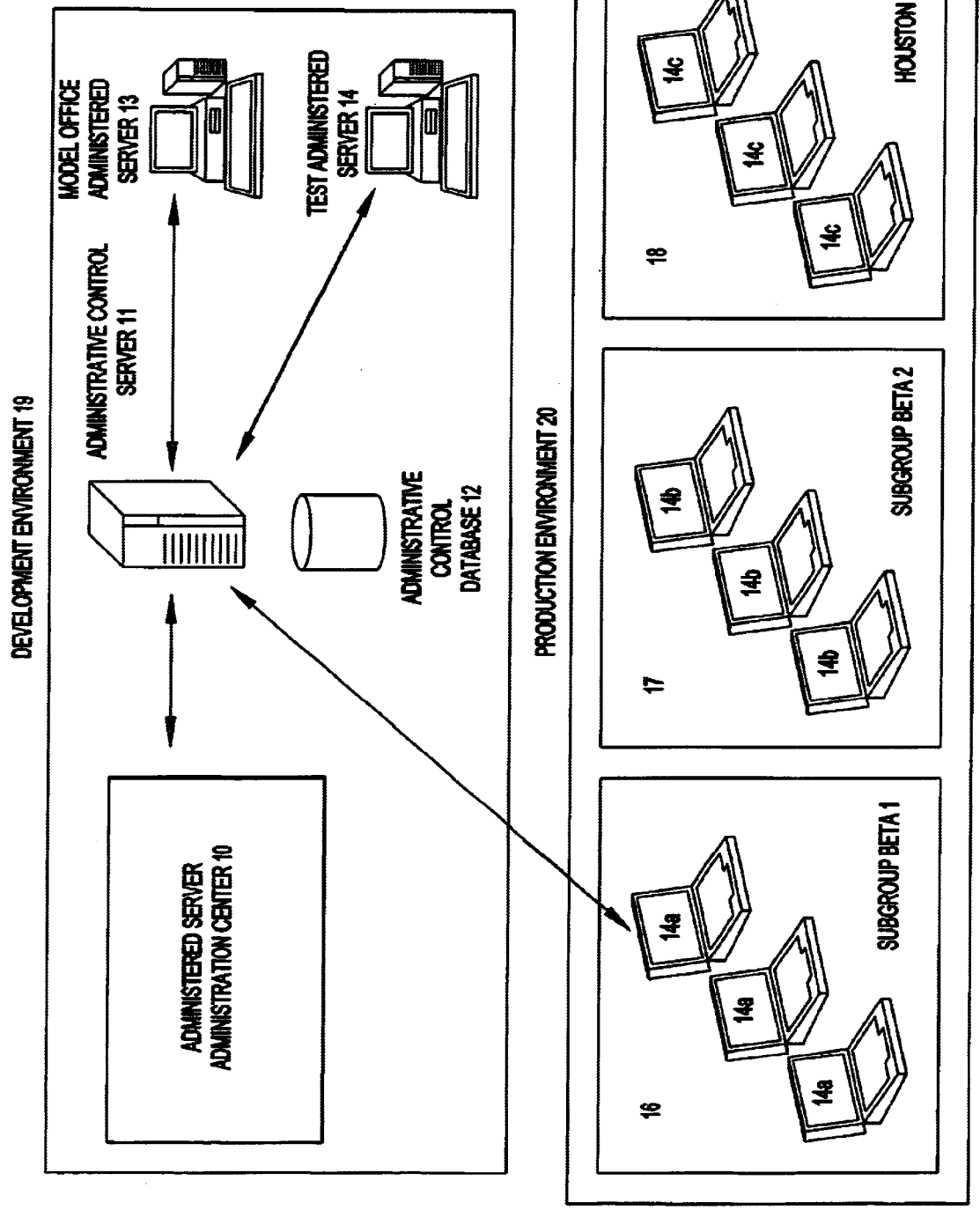

METHOD AND APPARATUS FOR SIMPLIFIED ADMINISTRATION OF LARGE NUMBERS OF SIMILAR INFORMATION HANDLING SERVERS

FIELD OF THE INVENTION

The present invention is directed to the administration of a computer network, particularly the administration of a network of servers, and provides a dynamic method of affecting change to the configuration of the servers.

BACKGROUND OF THE INVENTION

Administering large numbers of distributed database servers is a complex task comprising several dimensions.

One dimension of administrative complexity is the sheer magnitude of administered servers. That is, complexity is inherent in keeping track of, and dealing with, a great many things. When each such managed entity possesses unique characteristics or attributes, another layer of complexity, the second dimension, is introduced. Such identifying characteristics can be considered static in nature. That is, they define the managed entity, e.g. a network address, and tend not to change over time. However, there are states of operation or configuration that are dynamic, eg., creating, modifying, or deleting database objects managed by a server. That is, the act of administration will move a server from one state of configuration to the next. Indeed, non-administrative acts can alter the configuration of a server, sometimes rendering it's state unknown or unusable. This aspect of administrative complexity is the third dimension.

It is, therefore, an object of the present invention to provide a dynamic system and method of affecting change to the configuration of servers in a network of administered servers having at least one control server.

SUMMARY OF THE INVENTION

The present invention provides for the simplification of server administration in this complex environment by controlling each dimension in a systematic way. First, the complexity embodied by the first two dimensions can be characterized as the difficulty in managing large numbers of different things. In a sense, this is the static aspect of administration—accounting for, and awareness of, all the many entities under management. Second, which is the dynamic aspect of management, is concerned with affecting change to the configuration or state of each of the many managed entities. Although the managed entities are not identical, it is assumed there exist collections of different entities which share "similar" configurations. In this way, grouping can be used to reduce the many to a few. By managing a group of similarly configured servers, instead of managing each individual server, complexity is reduced. The invention provides a system and method for effecting a change of state to a group of a large number of similarly-configured, but not necessarily identical, managed entities in a controlled, simplified way is the essence of this invention.

One aspect of the invention provides an improved data processing system having an administrative control server; an administrative control database, connected to said administrative control server; and at least one group of servers having similar, but not necessarily identical, configurations adapted for communication with the administrative control server for administrative control thereby, in which the control server can change the configurations of the administered servers to a new desired configuration for each administered server where the new configuration is in synchronization with the configuration of each of said other administered server, by generating synchronization instructions from parameterized synchronization scripts stored in the control database.

Other aspects of the invention provides software and methods for said improved data processing system

BRIEF DESCRIPTION OF THE DRAWINGS

The invention will now be described in greater detail with specific reference to the appended drawings wherein:

FIG. 4 illustrates the application of the invention from a development to production environment.

DETAILED DESCRIPTION OF A PREFERRED EMBODIMENT OF THE INVENTION

Figure 1:
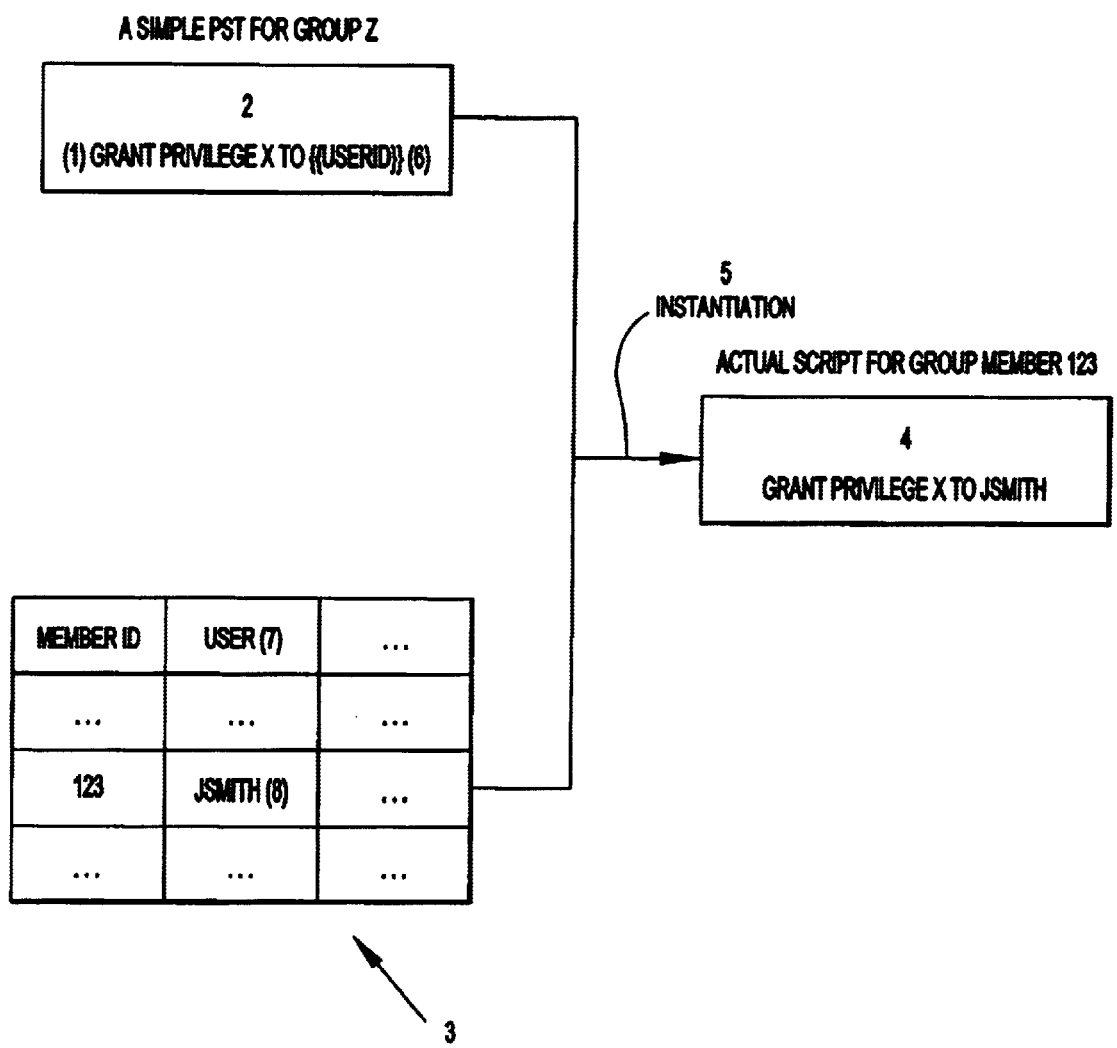
FIG. 1 illustrates the instantiation of a parameterized script template in accordance with this invention.

The advantages of the invention can be appreciated from the following example. Assume that all members of a group of similarly-configured managed entities, in this case database servers, are in the same initial state of configuration, State A, and that the desired act of administration involves moving all members of the group from State A to State B. For example, database servers may require optimization of their memory allocation configuration to improve performance. For this example, it is assumed that such configuration changes can be carried out by executing a script of commands at each database server. The "script" will be referred to as that which encapsulates the nature of the change of configuration, or the transition from State A to State B, the Parameterized Script Template (PST).

In this aspect of the invention, a PST captures the general nature of the configuration change. That is, it describes the state-transition actions that are common to all members of the group. In essence, it is a simplified, high-level, general description of the administrative changes that apply to all members of the group. This generalization reduces the complexity of managing large numbers of similarly-configured, including different, managed entities.

Although this high-level description of state-transistion actions is necessary for simplified management, the general description of actions is translated into specific actions for each member of the group in order to actually affect the desired change. The PST is, as its name indicates, a Script Template. It is a template of the actual script that a given member of the group (a database server) will execute. The script template is instantiated into an actual script that a database server executes by replacing embedded parameters with values specific to the database server. That is, the parameters in a PST represent the attributes or characteristics that are unique to each member of the group. In effect, the parameters allow for the existence of a general description of administrative action for the group (the PST) by abstracting away the differences among the members of the group.

The PST, therefore, is the mechanism by which the three dimensions of administrative complexity can be controlled systematically to reduce overall complexity. Instead of managing the configuration change that is unique to each server in a large group of servers, the invention manages a single change that can be applied to all members of a group of similarly-configured, but unique, servers.

A Parameterized Script Template (PST) is a script of commands, the language of which can be imperative or declarative, and within which are embedded parameter markers. As such, a PST is not a script that can be executed. Rather, it is a template of a family of scripts that are united in their purpose—the change of state or configuration that they are programmed to effect—and their target of application—the group of similarly-configured managed entities (database servers). The PST describes the state transition that all members of the group must follow, so it uses the embedded parameter markers to abstract away member-specific attributes or characteristics. The actual script that a group member must execute to effect the change of state is an instantiation of the PST wherein all parameter markers are replaced by corresponding values that particular group member's characteristics.

Referring to FIG. 1 which illustrates the instantiation of a PST, the important elements of this depiction are: the single command (1) in the simple PST (2), in which a single parameter marker{{userid}} (6) is embedded, the table (3) of unique characteristics of each group member; and the production of an actual script (4) for member 123 through the process of instantiation (5). The parameter marker, {{userid}} (6) in this example, identifies the desired attribute, userid (7). The process of instantiation replaces all such parameter markers within the script template with the corresponding values of the attributes for the group member. In this case, the parameter marker{{userid}} (6) is replaced with the value JSMITH (8). Group member 123 would then execute the instantiated script to effect the change of state embodied in the PST. Each input to the instantiation process will now be described in greater detail.

Characteristics of Group Members and Arbitrary Substitution Values

In a preferred embodiment of the invention, the characteristics or attributes of group members are stored in one or more relational tables of a Relational Database Management System (RDBMS). The key of this table is the unique identifier of a group member. In the most general case, parameter marker substitution values can be stored in relational tables, the key of which can be completely arbitrary. There exist different types of parameter markers that permit the substitution of both the specific characteristics of group members, and arbitrary substitution values.

Parameter Markers

The process of instantiation extracts the characteristics of a given group member from the relational tables described above as directed by the parameter markers. There are two types of parameter markers:

A) Table Parameters

Description: The table parameter is the most generalized mechanism for specifying scalar values. Essentially, one is able to specify a single column value for a single row of a relational table of characteristics. (It is assumed that all relational tables of characteristics reside within an administrative database. For the purposes of this discussion, this database will be referred to as DB.)

Syntax: {{<tablename>:<colname>:<predicates>}} where
tablename: fully qualified, two-part name of a table that resides within DB
colname: name of a column within tablename that contains the value to be substituted for the parameter maker
predicates: where clause predicates used to identify the row containing the column value of interest Usage: The components of the parameter marker are intended to be used so that a single columnar value is obtained:
SELECT colname FROM tablename WHERE predicates To ensure a single value is retrieved, there are several SQL language constructs that could be used in the implementation of the instantiation process, including:
use the FETCH FIRST ROW ONLY clause
use a cursor and issue only one fetch B) Contextual Parameters Description: Contextual parameters refer to values relevant in the context of the group member for which an instance of the PST will be generated. In other words, all of the attributes of the group member will be available to substitute into the script template to replace parameter markers. This is a restricted case of the more general Table Parameter, where predicates are implicitly defined to select the single row for the group member.

Syntax: {{<tablename>:<colname>}}
where
tablename: fully qualified, two-part name of a table that resides within DB, the key of which is the group member's unique ID.
colname: one of tablename's columns
Usage: The components of the parameter marker are intended to be used so that a single columnar value is obtained (assume that the key column is named ID):
SELECT colname FROM tablename WHERE ID=<group member's unique ID>

EXAMPLE

A simple PST consisting of a single command within which is embedded a single contextual parameter follows:
GRANT DBADM TO{{ADMIN.ATTRIBUTES:USERID}}
where it is assumed a relational table of name ADMIN.ATTRIBUTES, consisting of at least the column named USERID and the key column for the unique identifier of the group member, contains a row for each group member that will instantiate this PST. Assuming that this PST will be instantiated for a group member with a USERID of "jsmith", the following script will result after parameter substitution:
GRANT DBADM TO jsmith PSTs are an important mechanism in the Server administration model of "administration by group." A Server administrator will administer very large numbers of similarly-configured Administered servers. Administrative acts can be described using PSTs for a group of administered servers; control tables within the administrative database, that contain the characteristics of the group's administered servers, which are substituted for the parameter markers within the PSTs. During the process of synchronization, each administered server will maintain the consistency of its configuration with its group by instantiating and executing its group's PSTs.

The Administered Server Environment

Figure 2:
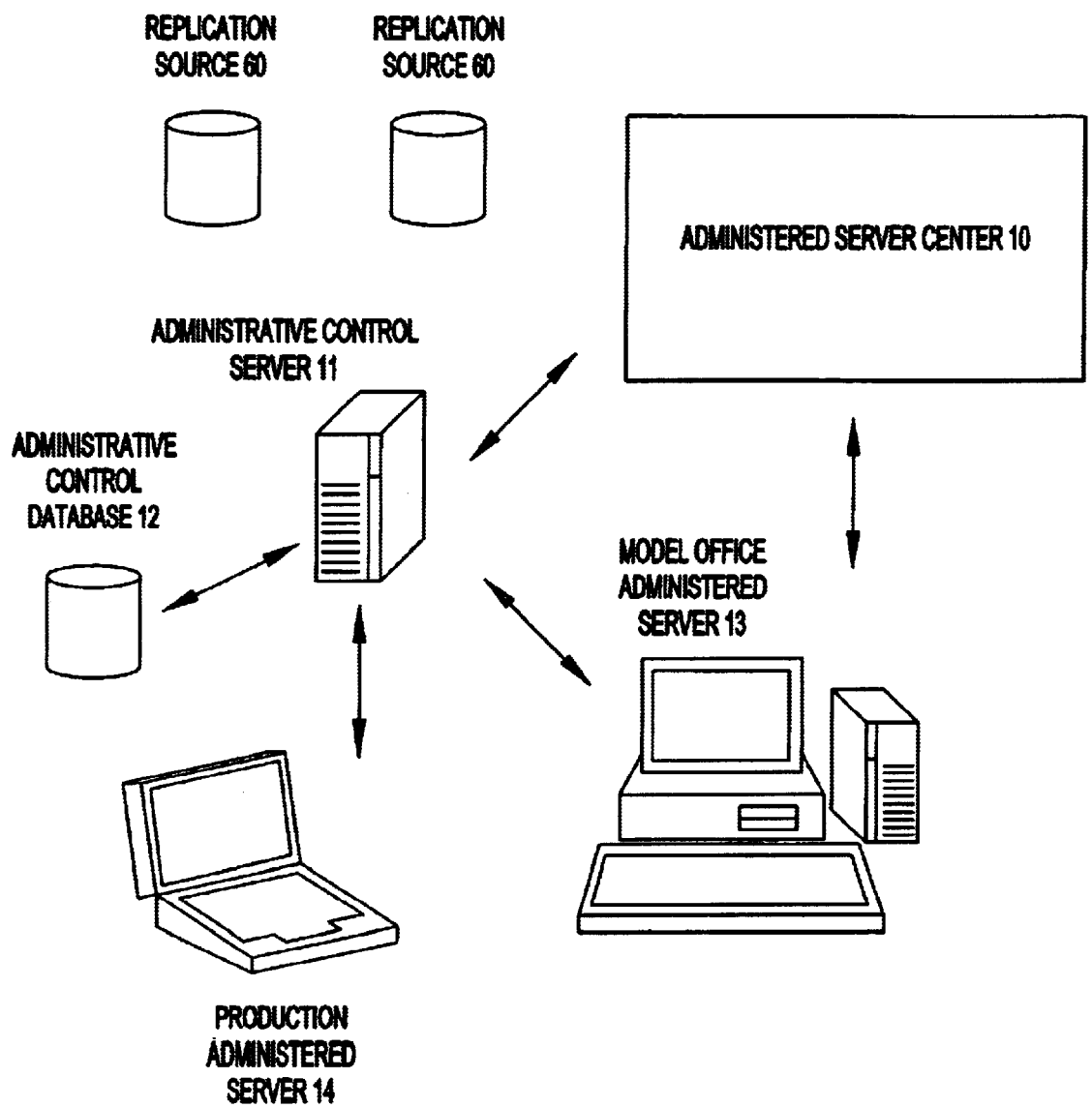
FIG. 2 illustrates a model office including a control server and administered servers.
Figure 3:
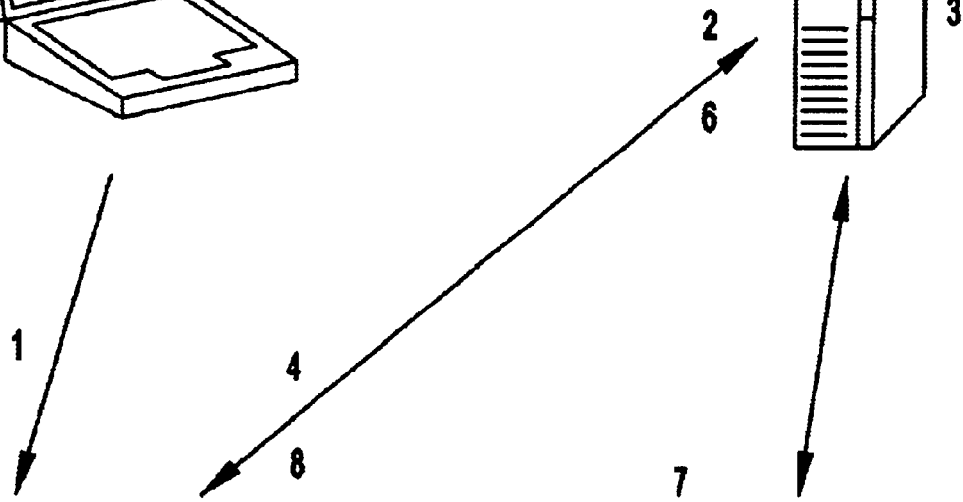
FIG. 3 illustrates the synchronization of administered servers from a control server in accordance with this invention.

The administered server environment such as depicted in FIGS. 2, 3 and 4 is an environment in which large numbers of servers can be administered from a central control site. Although the servers being administered (administered servers) need not be limited to database servers. The invention herein can be applied to the database environment and so for the purposes of this description we will discuss the invention in the context of database servers.

In the administered server environment, collections of database servers are set up. Each collection is known as a "group". Each database server that belongs to a group is called a "administered server". Groups are used to organize administered servers that have shared characteristics into single entities. The characteristics that many administered servers could share are the end-user application that runs on them, and the database definition that supports the application.

For the purpose of this description, database definition is the setup of the database system, including, but not limited to, the instance, the database manager configuration parameter values, the database design, and the database configuration parameter values. In a group, the administered servers are similar in terms of their database definition, usage, and purpose. For example, assume that there are two groups in an organization, Sales and Support. The Sales group would require one end-user application and database definition, while the Support group would require a different end-user application and database definition.

By grouping the administered servers together, an administrator can administer small numbers of groups, which may contain hundreds, if not thousands of administered servers, rather than having to administer each of the administered servers individually. If additional database servers that perform the same function as the administered servers of an existing group are acquired, they can be added to that group. The administration solution provided by the administered server environment is fully scalable.

In the administered server environment, the setup and maintenance of any database definition is accomplished by sets of scripts known as "batches". Because the database definition can be different for each group, each group has its own set of batches. The batches that are specific to a group are known as "group batches".

Within a group, administered servers may run different versions of the end-user application, and each version of the end-user application may require its own database definition and data. Group batches are preferably associated with a particular "application version". The application version represents the database definition and data that support a particular version of the end-user application.

Each server that belongs to a group (see FIG. 4, groups 16, 17 and 18) is known as an administered server. An administered server, because it belongs to a group, will have the same end-user application as the other administered servers in the group. Depending on its version of the end-user application, however, it may share its database definition and data with only a subset of the administered servers that belong to its group.

Information about the administered server environment is stored in a central database known as the "administrative control database". This database records, among other things, which administered servers are in the environment, the group each administered server belongs to, and which version of the end-user application an administered server is running. It also records the group batches that the administered servers execute. This database is on a database server that is known as the "administrative control server".

To set up and maintain its database definition, each administered server connects to the administrative control database to download the batches that correspond to its version of the end-user application. The administered server executes these batches locally, then reports the results back to the administrative control database. This process of downloading batches, executing them, then reporting the results of the batch execution is known as "synchronization". An administered server synchronizes to maintain its consistency with the other administered servers that belong to its group and that run the same version of the end-user application.

Referring to FIG. 2, in the administered server environment, administration can be hidden from end users as usually they do not need to learn about database administration. Instead, the administered server environment can be administered centrally from the Administered Server Center (10).

The administrative control server (11) contains the administrative control database (12), which records information about the administered server environment, and manages the synchronization process for administered servers. A database server can be used as a control server.

The information that configures and maintains administered servers is stored in relational tables in the administrative control database (12). Because these tables are in an ordinary database system database, this information is accessible to authorized users, and can be maintained (for example, backed up and restored) using standard database utilities.

Every administered server in the administered server environment must belong to a group. A group is a collection of administered servers that share one or more characteristics. The shared characteristics will be things such as the business function of the administered server users, for example, selling life insurance, and the end-user application that is used to support the business function.

An administered server can only be associated with a single application version. However, within a group, not all administered servers need to be associated with the same application version. This characteristic allows staged deployment of the application. The different versions of the end-user application are supported by the group batches that are associated with different application versions.

Note: The term "group", as used in the administered server environment, is not associated with operating system or security groups. An administered server is any database server that is both a member of a group and synchronizes with an administrative control server to maintain its database definition and data.

Along with the DBMS, the administered server will run the business application that end users require. The hardware on which the DBMS and the business application run can be any laptop or desktop computer on which any of the supported operating systems is running. There are two types of administered servers that can be present in the administered server environment: test administered servers and production administered servers. Test administered servers are used to test group batches that set up and maintain the database definition that supports the end-user application. When the group batches are fully tested, and produce satisfactory results, they can be promoted for use by the production administered servers of the group.

Typically, one would assign test administered servers to a development environment. That is, the test administered servers will not manage any active data that is required for business operations.

Production administered servers are assigned to the users that are supported. Unlike test administered servers, production administered servers are not used for testing purposes. Instead, these administered servers execute the tested group batches that have been put into production, which results in them having a stable database definition to support the end-user application. Because production administered servers have a stable database definition, they manage the active data that is required for business operations.

If a database definition on the production administered servers is no longer adequate to support the user requirements, the database definition on the test administered servers can be modified to address the problem that is being reported. When the results of the modification in the development environment are satisfactory, the modification can be made available to the production administered servers.

Referring to FIG. 2 again, which provides an overview of how the Administered Server Center (10), the administrative control server (11), and the model office administered server (13) can interact, a model office administered server is a special member of the test administered servers in the group. Typically, one has one model office administered server for each version of the end-user application that is deployed in the group. A model office administered can be used for a variety of purposes:

To model initial deployment of the group. When the model office administered server is set up, an install image can be created that is based on the model office administered server.

To test the changes that are required to the database definition and data that supports a version of the end-user application that is already in production. The model office administered server provides a representative database, which one can work with using tools such as the Administered Server Center, The behavior of the scripts can be verified by submitting them to execute against the model office administered server. This means that the production environment is almost entirely isolated from the changes that are made to the model office administered server. When the database definition changes that the scripts produce on the model office administered server are satisfactory, the scripts are promoted to production. The changes will then be executed by the group's production administered servers.

To provide a representation of a typical administered server in the group. Because the model office represents a typical administered server, it can be useful for problem determination. If an end-user experiences a problem, use the model office administered server, or a copy of it, to reproduce the problem and determine how to fix it.

To deploy a new version of an end-user application. The model office administered server can be used to verify that the installation of the new version of the application provides the correct results, and that the batches produce the expected database definition and data for the end-user application.

Although the administered servers of a group run the same end-user application, they do not have to run the same version of this application. Each version of the end-user application may require a database definition that is different from the other versions of the same application. To set up and maintain the database definition and the data to support a particular version of the end-user application, group batches are used for the application version. Each application version of a group is associated with its own batches.

Each batch is a collection of one or more batch steps. Batch steps can be created to set up and maintain both the database definition and the data for the application version. The batch step is executed on the administered server when the administered server synchronizes.

A batch step is made of the following components:

A script. As an example, a script can be a database command, an SQL statement, or an operating system command.

An execution target. By way of example, the scripts that are created can execute against a database instance, database, or on the operating system on the administered server. The database instance, database, or operating system against which the script executes is known as an execution target.

Authentication credentials. Before a script can execute against a database or operating system, for example, it must be authenticated. That is, the script requires the combination of a user ID and password so that, for example, the administered server can connect to the database. This combination of user ID and password is known as authentication credentials.

A success code set. The execution of a script is considered to be successful if its return code is within a set of return codes predefined for that script. This set of codes is known as a success code set.

The batch steps within a batch are always executed in the sequence in which they appear in the batch. When one batch step within a batch is executed success fully, the next batch step is executed. If, as defined by the success code set, an error occurs when an administered server is executing a batch step, that administered server stops executing its group batches, and reports an error back to the administrative control server. When the error is fixed, the administered server can continue executing from the batch step that caused the error.

The application version is set at the administered server, typically during the installation and configuration of the end-user application on the administered server. When an administered server synchronizes, it reports its application version to its administrative control server before it downloads and executes the scripts associated with the group batches for the application version.

The administered servers of a particular group need to be in a state consistent with the other administered servers of its group. The consistent state can be accomplished with synchronization.

FIG. 3 provides a high-level view of how an administered server synchronizes. Before the administered server (14) can synchronize, it must connect to the network on which the administrative control server resides. The administered server can connect with the network in a variety of ways, such as by a dial-up program, by docking with the network, or by remaining permanently connected to the network.

The administered server synchronizes as follows:

1. The synchronizer function (15) is invoked by the administered server (14). The invocation can be from a user application or from a database Synchronizer application that is provided with the DBMS. When the synchronizer function (15) is invoked, steps 2 through 8 occur automatically. No manual intervention is required. The administered server (14) is only connected to the administrative control database (12) for step 3 and for step 7.

2. The administered server connects to the administrative control database (12), where it is authenticated.
3. After authentication occurs, the administrative control server checks which group the administered server belongs to, and the version of the application that the administered server is executing. The administrative control server uses this information to determine which batches the administered server should execute, and which batch steps should be executed, if any. At this time, other events may also occur:
   a) If the administered server could not upload the results of its previous synchronization session to the administrative control database, the results are written at this time.
   b) If any of the scripts in a batch to be downloaded are parameterized, the database control server instantiates the script with the values that are appropriate for the administered server.
   c) When steps 3a and 3b are complete (if required), the administrative control server releases the scripts that the administered server is to execute, and the administered server downloads them. When this occurs, the tables in the administrative control database are updated to indicate that the administered server has obtained the batches that apply to it.
4. The synchronizer function drops the connection with the administrative control database.
5. The administered server executes the batches that it downloaded.
6. After executing the batches, the synchronizer function again connects to the administrative control database.
7. The synchronizer function updates the log information in the administrative control database with the results of the execution of the different steps of the batches. The log information provides details about the execution of the batch steps.
8. The synchronizer function drops the connection with the administrative control database.

After the synchronization session is complete, the administered server can be disconnected from the network, if required.

Within a group, administered servers run the same end-user application, have a common interest in the same data, have similar database definitions, and perhaps the same execution environment. Typically, within a group, the administered servers are used by people with the same occupation, such as selling life insurance.

The group can contain administered servers that run a different version of the end-user application. Because the database definition and data that support each version of the application are set up and maintained by the batches of a specific application version, different versions of the end-user application can be deployed. This enables one to stage the deployment of a new version of the end-user application within the group.

Because administered servers are organized by group, one administers at the group level, and not at the individual administered server level. This greatly simplifies administration. Instead of having to manage hundreds, if not thousands, of administered servers separately, one manages the group to which they belong. The group batches that maintain the database definition and data for a particular version of an end-user application are associated with the application version. These group batches are organized into application versions for each version of the end-user application running on the administered servers of the group.

When one creates new administered servers for the administered server environment, one adds them to the group that is already running the end-user application that the new administered servers will run. When these administered servers synchronize for the first time, they will download and execute the group batches that apply to the version of the end-user application that they are running. No special tasks have to be performed to integrate these administered servers into the environment. This means that the administration model that is used to set up and maintain the administered server environment is fully scalable. The groups that are set up can contain as many administered servers as the business requires.

The Administered Server Administration Center (10) is used to set up and maintain administered servers, groups, and the batches that the administered servers execute when they synchronize.

FIG. 4 shows a sample setup of the administered server environment. In the example, the development environment (19), which includes the Administered Server Administration Center (10), the administrative control server and administrative control database (12), as well as the model office administered server (13) and test administered servers (14t), is almost entirely separate from the production environment (20). The development environment can be used both to create and test the batches that the production administered servers will execute. In FIG. 4, all the production administered servers (14a, 14b, 14c) in the production environment (20) belong to the same group, but belong to different subgroups (16, 17, 18). Subgroups can be used to stage the deployment of the first version of the end-user application.

When rolling out the first version of the end-user application, the deployment is staged to control which administered servers can synchronize (that is, which administered servers can execute the group batches). The deployment is also staged to test whether the database definition and data is appropriate for the end-user application in the production environment. While the group batches may produce correct results on the model office and test administered servers of the development environment, the active data of the production environment may indicate that the group batches have to be modified. For example, in FIG. 4, the subgroup (16) Beta 1 is the first stage of the deployment, that is, only the Beta 1 subgroup can synchronize with the administrative control server. Assume that reports are received from the Bata 1 users that the performance of the end-user application is not satisfactory. The application-performance problem can be addressed, then, when the problem is resolved for the Bata 1 subgroup, continue by rolling out the Beta 2 subgroup (17). Because the Beta 1 and Beta 2 subgroups are running the same version of the end-user application, they execute the same group batches of the same application version. This means that the Beta 2 subgroup is not likely to report the same problem as the Beta 1 subgroup. To stage the deployment of the first version of the application by subgroups, the administered servers are enabled, subgroup by subgroup, to execute the group batches.

Subgroups can also be used to stage the deployment of the next version of the end-user application. For example, assume that the Beta 2 and Houston (18) subgroups are running the first version of the end-user application, and that the second version of the application has been tested on a model office or test administered server, then installed the new version of the application on the Beta 1 subgroup. In this situation, all the subgroups will be enabled to synchronize, and all will be maintaining active data. The difference is that when the Beta 1 subgroup synchronizes, it executes the group batches associated with the second application version, while Beta 2 and Houston execute the group batches of the first application version. In this situation, the Beta 1 subgroup can be used both to determine whether the new version of the end-user application is appropriate for your business requirements in the production environment, and whether the group batches that the Beta 1 subgroup executes produce satisfactory results.

Batches are used to ensure that the administered servers in a group remain as similar as possible. All the group administered servers execute the same group batches that set up and maintain the database definition and data for their version of the end-user application. They also execute the batch steps of these batches in the same order. Because the group administered servers execute the same group batches and batch steps, each administered server in the group will be similar. Batches can also be used to fix administered servers that either report problems, or require an adjustment. The function of a batch depends on its mode.

A batch is an ordered set of batch steps. A batch step is the combination of a script, the target against which the script is to execute, the authentication credentials required for the script to execute against a database or operating system, for example, and a success code set to indicate whether the script completed success fully or not. The script can be, for example, a DBMS command, SQL statement, or an operating system command to be run by an administered server.

There are three different modes of batches in the administered server environment:

Group To set up and maintain the database definition and data on administered servers, group batches are used. A group batch is associated with a particular application version. In addition each administered server is associated with an application version. When an administered server synchronizes, it downloads and executes the group batches for its particular application version. The administered servers always execute the batch steps of the group batches in the same order. Before the group administered servers execute the batch steps, they are all similar. When all the administered servers have executed all the batch steps of all their group batches, they remain similar.

Because the administered servers execute the group batches to maintain their database definition and data, one only has to work with the batches, instead of individually maintaining the hundreds, if not thousands of group administered servers.

A group batch will be either a setup, update, or cleanup batch.

Fix In any environment, problems may occasionally occur. A fix batch is one that is created to fix a problem on one or more administered servers. This is in contrast to the purpose of group batches, which is to set up and maintain the database definition and data for a specific version of the end-user application. Because of this difference of purpose, fix batches are not assigned to a specific group or to an application version.

Unassigned An unassigned batch is one that maintains its mode until it is assigned to either:

An application version, to be executed by a group as a setup, update, or cleanup batch An administered server, that will execute the batch as a fix batch.

An unassigned batch can be modified in any fashion, and deleted. If an unassigned batch is assigned to an application version, the batch becomes a group batch. If the batch is assigned as a fix batch, which is used to make changes to a specific administered server, the unassigned batch becomes a fix batch. In both cases, the change in how the batch is used permanently changes the mode of the batch. That is, the batch cannot be changed back to an unassigned batch.

Group batches are associated with an application version, and are used to set up and maintain the database definition and data on the administered servers that are running a particular version of an end-user application.

Even though the administered servers in the group may execute the batch steps at different times, each administered server of the group will execute the same set of batch steps, and will execute them in the same order. This ensures the consistency of the administered servers that belong to the group. It also simplifies the management of large numbers of administered servers. One is aware that the administered servers are similar because they have all executed the same set of steps in the same order. If the administered servers started out similar before executing the batches of an application version, they will remain similar after they have all executed the batches.

Three types of group batches can be executed by administered servers when they synchronize: setup, update, and cleanup. Typically, the setup batch will be used to set up, for example, the database definition for the administered server, the update batch to maintain the data on the administered server, and the cleanup batch to perform cleanup activities on the administered server. Using group batches allows consistency to be maintained among the administered servers of a group without having to maintain each administered server separately. Only one of each type of group batch can be associated with an application version.

When the administered server synchronizes for the first time, it executes, in order, the batch steps of the setup batch to configure itself, the batch steps of the update batch to, for example, populate its tables, and the batch steps of the cleanup batch to perform any cleanup activities. After an administered server synchronizes for the first time, it will execute any new batch steps that are appended to the setup batch to modify its database definition (if required). The administered server then executes all the batch steps of the update batch to maintain its data. Finally, the administered server will execute any batch steps that are appended to the cleanup batch.

Details about the different types of group batches are as follows:

Setup A setup batch is an ordered set of batch steps that is executed first, before any other batches. Each batch step in a setup batch is run only once by an administered server. If a new batch step is added to the setup batch, and the setup batch has already been executed by a given administered server, only the new batch step will be executed by that administered server. The setup batch can be used to set up, for example, the database definition on the administered server, including schemas, tables, indexes, and any other database objects that are required. The setup batch can also be used to set configuration parameter values and to set up data replication.

Update An update batch is an ordered set of batch steps, and each step is executed every time that the administered server synchronizes. This type of batch is run after a setup batch is run, and before a cleanup batch is run. The batch steps in an update batch are those that can be repeatedly executed. A typical update batch will consist of a data synchronization batch step.

The steps in an update batch are considered to be idempotent, in the sense that they can be repeatedly executed without changing the current state or database definition of the administered server to a different state with each invocation of the step. For example, a table can be replicated multiple times without resulting in a change in the replication configuration. In contrast, the batch step in the setup batch that originally created the table would be executed only once.

Cleanup A cleanup batch is an ordered set of batch steps that is executed last, after the update batch. Each batch step in a cleanup batch is run only once by an administered server. If a new batch step is added to the cleanup batch, and the cleanup batch has already been executed by a given administered server, only the new batch step will be executed by that administered server. A typical cleanup batch is one that contains a batch step that updates the database statistics.

Depending on requirements, it may not be necessary to create all three types of group batches. For example, a different mechanism may be used to set up the database definition than the setup batch. If a specific type of batch does not exist when an administered server synchronizes, that batch type is bypassed.

At some point in time, a new version of the end-user application may need to be deployed. Typically, a new version of an end-user application will require a different database definition than the previous version. Consequently, the batches and the associated scripts used to maintain the new database definition will be different.

If there are a large number of administered servers in a group, one may probably want to stage the deployment of a new version of the end-user application within that group. That is, one will want to keep most administered servers of the group at one version of the end-user application, and use a subset of the group administered servers to determine whether the new version of the application meets business requirements. To stage the deployment, however, it may be necessary to support more than one set of batches for a group of administered servers. There will be one set of batches for each version of the end-user application that is used by the group. That is, one set for the original version, and one set for the new version to be deployed. The administered server environment supports this requirement through the implementation of application versions.

Each collection of setup, update, and cleanup batches that maintains the database definition and data for the end-user application is associated with an application version. For every version of the end-user application that is used in a group, a different application version is required, and its associated batches. Every group, therefore, must have at least one application version.

When an application version is created on the administrative control database, a unique identifier is supplied for the application version. After the application version is created, setup, update and cleanup batches may be associated with it.

An administered server will run a particular application to fulfill a specific business requirement. The version of the application on the administered server is identified by the application version that is set on the administered server. The application version is usually set on the administered server during the installation of the end-user application. When a value is set on the administered server for the end-user application, the same identifier used on the administrative control database should be used.

When an administered server synchronizes, it uploads its application version to the administrative control server. The administrative control server uses this information, in conjunction with the group that the administered server belongs to, to determine which of the group batches the administered server will execute. The administrative control server only allows the administered server to download and execute the group batches that correspond to the administered server's application version.

Assume that there is a large group of users who will all sell life insurance using the first version of the end-user application. Because the group is large, it may not be practical to perform the deployment at one time. Because of this, the deployment is staged.

To stage the deployment, administered servers that have a shared characteristic are enabled, such as a common subgroup, to begin executing the group batches. As more and more administered servers are deployed scaling the environment larger and larger, it may be that the database definition and data that seemed appropriate for the application in the earlier stages of the deployment is no longer adequate. For example, reports may be received that performance of the end-user application is becoming worse for many users. It may be that the amount of data that is maintained by each administered server is larger than originally anticipated. This situation may not necessarily result in administered servers returning errors and requiring fix batches, but it may be necessary to make some changes to the database definition. In this situation, adding indexes to one or more tables will improve the performance of the end-user application. Rather than creating a new application version, which is appropriate only if the version of the application that end users run will be changed, a new level of the existing application version would be created. This new level of the application version can then be modified to change the database definition.

A new level of an application version is a copy of the setup, update and cleanup batches of the previous level of the application version. One or more additional batch steps can be added that are designed to modify the database definition or data. Each level of an application version is associated with a particular number. For example, the first level is level 0, the second level is level 1, and so on. In addition, a level can be a test level for execution by test administered servers, a production level for execution for production administered servers, or an obsolete level that is not executed by any administered server.

In the new copy of the setup and cleanup batches, only new batch steps can be appended. The contents or the order of any existing batch steps cannot be modified. The next time the administered servers synchronize, they will only execute the new batch steps of these two batches. All the administered servers will execute the new batch steps in the same order, ensuring that the administered servers remain consistent after they all execute the new batch steps. If there are new administered servers that have never synchronized, they will execute all the batch steps, including the new ones. Because all the administered servers in a group that have the same application version run the same setup and cleanup batch steps in the same order, they will have a similar database definition and data after they execute all the batch steps.

The new level of the update batch, however, can be modified in any way required. Unlike the situation that applies to setup and cleanup batches, an administered server executes all the batch steps of the update batch each time that it synchronizes. By definition, the update batch is idempotent. That is, an administered server can execute the update batch repeatedly without changing its current state or database definition.

The way that an application interfaces with its data does not change within a version of an application. Once the underlying database definition is set up to support the end-user application, it is unlikely that it will be necessary to substantially modify it. Rather, the database definition will be extended in small ways to address intermittent problems such as performance. For this reason, the setup and cleanup batches can only be appended to. Although the database definition sets the structure of the data, with a fixed number of tables and columns, the data content is subject to continual updates. One of the primary uses of the update batch is to replicate data between the administered server and one or more replication sources. The replication operation can be changed in any way to ensure that administered servers have the data that they require. For this reason, the update batch in a new level is fully modifiable.

In the situation described above, in which the performance of the application is impacted because of an increase in the amount of data managed by each administered server, a new batch step would be added to the setup batch to create indexes. All administered servers in the group that have the same application version will execute the new batch step to create the index when they next synchronize. Differences exist, however, in the number of setup batch steps that the administered server will execute when it next synchronizes, depending on when the administered server was rolled out:

If an administered server was part of an earlier stage of the deployment, and has already executed all of the original group batches, this administered server will first execute the new batch step in the setup batch to create the indexes, then continue by executing the update batch. The new index will result in improved performance for the end-user application.

If an administered server is new and has not yet synchronized, the first time it synchronizes, the administered server will execute all the batch steps in the setup batch, including the new batch step that creates the indexes. When this administered server completes the synchronization process (that is, it executes all batch steps to the end of the cleanup batch), it will be consistent with older members of the group. This administered server will not report the performance impact on the end-user application.

The levels of an application version allow maintenance and management of the changes to the database definition and data within an application version. Because the Administrative Control Database maintains a history of the different levels of the application version, changes that have occurred over the life time of the application version can be tracked.

Levels simplify the administration of groups because they allow testing of database definition changes on test administered servers, without affecting production administered servers. Levels also allow the hundreds (or thousands) of production administered servers that belong to a group to be maintained. Each level in a application version has one of the following states: test, production, or obsolete. When the first level for an application version is created, that level, and the batches associated with it, are in the test state. These test batches set up and maintain the database definition and data for the test administered servers. These test batches can be modified until the results are satisfactory in that they produce on the test administered servers. Then, the test level is promoted to production.

When the level is promoted to production, the batches associated with this level can be executed by the production administered servers. All the administered servers of the group need not be enabled at the same time to begin executing the production batches at the same time. For example, subsets of the group administered servers may be progressively enabled to execute the production batches. Subsets of the administered servers can be deployed according to a characteristic that the subset shares, such as a subgroup. When these administered servers are enabled, they will download and execute the production batches the first time that they synchronize. Over time, all the group administered servers will be enabled to execute the production batches.

When the production administered servers are executing the batches of the production level, it may be necessary to modify the database definition or data generated by the production batches to address a problem. For example, assume that users are calling in, saying that performance of the end-user application is becoming worse over time. It is determined that adding indexes to a table will improve the performance of the application. To fix the problem, a new test level is created from the existing production level. Than a batch step is appended to the setup batch to create the indexes. Because the new level is in the test state, only the test administered servers will be able to execute the new batch step of the test setup batch. When the results that the test batch generates are satisfactory on the test administered servers (that is, the performance of the application is again satisfactory), the test level is promoted to the production level. The next time that they synchronize, the production administered servers will download the new batch step and create the indexes.

The levels, and the associated states, represent the life cycle of the application version and its associated batches. Additional details about states are as follows:

Test A test level is used to try out changes on the test administered servers of the group. The batches of a test level can only be executed by test administered servers. Whether a new group is being deployed, or changes to the definition are being tested, the batch steps in a test level should be tested to ensure that they produce the desired results. There can only be one level in the test state. With only one test level, one always knows which batches have been modified, and which changes are being tested.

By default, the first level of an application version is created in the test state. This level is level 0. When level 0 is created, all the batches and batch steps that are added to it are in the test state. When level 0 is in the test state, all of its batches and batch steps can be modified. This includes the reordering or deletion of batch steps, and the deletion of the batches.

If a new test level was created from a production level, the setup and cleanup batches can contain a mixture of production and appended test batch steps:

The production steps of the setup and cleanup batches cannot be modified or reordered. Test batch steps can only be appended after the production batch steps to ensure that the changes that occur on the test administered servers result from the test batch steps, and not from changes in the order of the production batch steps.

The steps of the update batch in the test level are at the test state. They can be modified in any way.

When the results of a test level are satisfactory, it can be promoted to production, so that the batches within it can be executed by production administered servers.

Production

The production level is used to set up and maintain the definition and data for the application version that the production administered servers run. Because the batches associated with the production level are fully tested before being promoted, they provide predictable results when the administered servers execute them. Using fully tested batches in a production level allows scaling of your administered server environment to any size required.

To ensure consistency among the administered servers that execute them, production batches cannot be modified or deleted, nor can the batch steps within them. When a test level is promoted to production, all the batches associated with it are set to the production state.

A production level of an application version cannot be directly created. A production level is always a test level that was promoted to production. In this way, test administered servers can be used to test and tune changes to batches. This helps to isolate testing from the production environment. A test level must always be explicitly promoted to production before the production administered servers can execute the new or changed batches.

There can only be one production level of an application version. If there is an existing production level and a test level is promoted to production, the existing production level becomes obsolete. The existing production level is obsoleted because the database definition or the data that it sets up and maintains is no longer adequate to support the end-user application.

If one or more batches of a production level no longer meet all of your requirements, a new test level can be created from it.

Obsolete An obsolete level is no longer adequate to support the end-user application. For this reason, the batches of an obsolete level cannot be executed by any administered server. There are two ways in which a level can become obsolete:

A new production level supersedes it. This occurs when a test level is promoted to production, and replaces an existing production level.

It can be made explicitly obsolete when it is no longer required.

There can be many obsolete levels. If it is necessary to be able to track the changes to an application version, they should be kept.

The levels of an application version support a test/production/obsolete development model, which can be used in conjunction with the procedure that is used to implement an end-user application.

The following table is an overview of an application version, the available batch types, and the states at which a level can be:

| | Application Version | | |
| --- | --- | --- | --- |
| | Levels | | |
| Batches | Test State | Production State | Obsolete state |
| At most, one of the following types of batches can be associated with any level of an application version:<br>* Setup<br>* Update<br>* Cleanup. | The batches of a test level can only be executed by test administered servers When a level is created, the level and the batches that it contains are always in the test state. The batch steps, however, may be a mixture of test and production batch steps. This enables you to validate the changes to the batches before making them available to the production administered servers. An application version can contain only one test level. | The batches of the production level can only be executed by production administered servers. The batches and batch steps of a production level cannot be modified in any way. This guarantees consistency among your production administered servers. An application version can contain only one production level. | The batches of an obsolete level cannot be executed by any administered server. This occurs because obsolete batches are no longer adequate to support the end-user application. multiple obsolete levels of an application version can exist. They can be used to track the changes that have occurred to the configuration and data that support the end-user application. |

The discussion that follows describes the test/production/obsolete development model, and how this model applies to the levels of an application version through the life cycle of the application version.

When the first level of a new application version is created, that new level is identified as level 0 and is created in the test state. In the example that follows, there are two batches: configure, which sets up the database definition, including data replication; and replicate, which maintains the data used by the end-user application:

| | | Application Version | | |
|---|---|---|---|---|
| Level | State | Setup Batch | Update Batch | Cleanup Batch |
| 0 | Test | configure | replicate | |

Test administered servers are used to fully test the batches associated with this level of the application version. When the results on the test administered servers are satisfactory, this level is promoted to production. (If the results are not satisfactory, batches can continue to be modified until they produce the correct results. Alternatively, level 0 could be deleted, created again, and new batches created for level 0). When level 0 is promoted, the production administered servers can execute the batches of this level. Level 0, which was at the test state, then moves to the production state, as follows:

| | | Application Version | | |
|---|---|---|---|---|
| Level | State | Setup Batch | Update Batch | Cleanup Batch |
| 0 | Production | configure | replicate | |

Assume that the system is in full production, and a performance problem is identified. To address this problem, an index is added to one of the replicated tables. It is necessary to test this database definition change on the test administered servers before making it available to the production administered servers. To do this, start by creating a test level of the existing production level. This new level is in the test state and is a copy of the existing production level. Then, edit level 1 and append a new batch step to the configure batch to create the index:

| | | Application Version | | |
|---|---|---|---|---|
| Level | State | Setup Batch | Update Batch | Cleanup Batch |
| 0 | Production | configure | replicate | |
| 1 | Test | configure (with batch step added to create index) | replicate | |

Again, the test administered servers are used to fully test the changes associated with the new test level, level 1. Because all members of the test administered servers already executed all the batch steps associated with level 0 when it was in the test state, the test administered servers will only execute the new batch step in the configure batch to create the index when they next synchronize. (They will also execute the entire replicate batch.) When the results of the index creation are satisfactory, promote level 1 to production. Then the production administered servers execute the batches of this level. Level 0 is no longer adequate to support the end-user application. Because only database definition can be in use in the production environment, level 0 is rendered obsolete:

| | | Application Version | | |
|---|---|---|---|---|
| Level | State | Setup Batch | Update Batch | Cleanup Batch |
| 0 | Obsolete | configure | replicate | |
| 1 | Production | configure (with batch step added to create index) | replicate | |

When they next synchronize, the production administered servers that have previously synchronized execute only the create index batch step of the configure batch. Administered servers that are synchronizing for the first time execute all the batch steps of the configure batch, including the create index batch step. To maintain the end-user application data, all administered servers run the replicate batch after they execute the configure batch.

Again, time passes. Although the tables are indexed, reports are received that the performance of the end-user application is slowly becoming worse. In order to perform data reorganization on the tables on the administered server to reduce data fragmentation, it is again necessary to create a test level from the production level. A cleanup batch could be added to contain the batch step that reorganizes the data. In this way, the data is reorganized after it is updated by the replicate batch:

| | | Application Version | | |
|---|---|---|---|---|
| Level | State | Setup Batch | Update Batch | Cleanup Batch |
| 0 | Obsolete | configure | replicate | |
| 1 | Production | configure (with batch step added to create index) | replicate | |
| 2 | Test | configure (with batch step added to create index) | replicate | reorganize |

Again, level 2 is tested with the test administered servers. When the results are satisfactory, level promoted to production. Level 1 is automatically made obsolete:

| | | Application Version | | |
|---|---|---|---|---|
| Level | State | Setup Batch | Update Batch | Cleanup Batch |
| 0 | Obsolete | configure | replicate | |
| 1 | Obsolete | configure (with batch step added to create index) | replicate | |
| 2 | Production | configure (with batch step added to create index) | replicate | reorganize |

Assuming no new administered servers join the group, all administered servers bypass executing the configure batch, because they have already executed all of its steps. The administered servers start by executing the replicate batch to maintain the data for the end-user application. When the administered servers complete executing the replicate batch, they run the reorganize batch to reorganize the table data. Each administered server only executes the batch step in the reorganize batch once.

Update Batch in a Test Level

When a new test level is created, the update batch steps that were copied from the production level of the update batch are changed to the test state. In this way, the steps and their order in the batch can be modified as required. Because the update batch is, by definition, idempotent, it should not modify the state or definition of the administered server. For example:

If the update batch is used to back up a database, it may be necessary to change the backup buffer size to obtain better performance.

If an operation is timing out, a parameter can be changed that controls the amount of time that it can take to complete.

In these examples, the changes are implemented by minor changes to existing batch steps in the update batch.

Continuing the example, assume that it is necessary to want to back up one mission critical table on the production administered servers each time that these administered servers synchronize. Assume that it is necessary to have a snapshot of the data of this table before the data is refreshed. A test level is created from level 2, the current production level. Because it is necessary for the backup image to contain a snapshot of the data before it is refreshed, the backup tablespace batch step would be added before the batch steps that update the data:

Application Version

| Level | State | Setup Batch | Update Batch | Cleanup Batch |
|---|---|---|---|---|
| 0 | Obsolete | configure | replicate | |
| 1 | Obsolete | configure (with batch step added to create index) | replicate | |
| 2 | Production | configure (with batch step added to create index) | replicate | reorganize |
| 3 | Test | configure (with batch step added to create index) | replicate (backup tablespace followed by data replication) | reorganize |

When the results are satisfactory, level 3 would be promoted to production. Level 2 would be automatically rendered obsolete.

Promoting a Test Level to a Production Level

When a level is created in an application version, it is created in the test state. By definition, only test administered servers can execute the batches of a test level. After the batches in the test level produce the correct results, it will be necessary for the production administered servers to execute them. To do this, the level must be promoted to production.

If there is already a production level and the test level is promoted, the existing production level will be moved to the obsolete state. This occurs because the previous production level is no longer adequate to support the end-user application. Because the test level is a copy of the batches and batch steps of the previous production level, no batch steps are lost from the previous production level. This means that the first time any new production administered servers synchronize, they will run the same production batch steps in the same order as administered servers that were rolled out earlier. The resulting database definition and data on the new administered servers will resemble that of other members of the group. In this way, consistency is maintained across the group.

Creating a Test Level from a Production Level

As described earlier, it may be necessary to refine or extend a setup, update, or cleanup batch that is associated with a production level. When a test level is added, all the batches and batch steps of the production level are copied to the test level. Existing batch steps in the setup and cleanup batches cannot be modified or reordered. Instead, only test batch steps can be appended to these batches. The update batch can be modified in any way required.

In the case of the setup and cleanup batches, the test administered servers will execute only the appended test batch steps. For the update batch, the test administered servers will execute all the batch steps, regardless of whether the batch is changed.

Making a Production Level Obsolete

When a production level is made obsolete, the batches associated with it can no longer be executed by any administered servers. All the batch steps in the batches become obsolete. There are two ways in which a production level can be obsoleted:

By promoting a test level to a production level when there is already an existing production level. The existing production level is no longer adequate to support the end-user application, so it becomes an obsolete level.

By manually rendering a production level obsolete. A level is made obsolete to prevent the execution of its batches, for example, while working on a new test level. Or, if a new version of the end-user application has been fully deployed, which has a different application version. In this situation, no new levels of the previous application version should be created because it is no longer in production.

Relationship Between Batches and Batch Steps

Batches are ordered sets of batch steps. Batch steps, when in group batches, can be test, production, or obsolete batch steps, depending on the state of the associated level. Each batch step contains a script, as well as other information, which the administered servers use to set up and maintain the database definition and data for the end-user application that runs on the administered servers.

The type of the batch step controls whether that batch step is executed by test or production administered servers, and whether the batch step is modifiable. The relationships between the state of a level and the state of batch steps are as follows:

When an application version is first created, the first level added to it is level 0. This level is at the test state, and is empty. It has no setup, update, or cleanup batches. As batches are created for level 0, their steps are in the test state. This occurs because it will be necessary to rigorously test the batches and batch steps with the test administered servers to ensure that they set up and maintain the database definition and data correctly.

Because all the batch steps are in the test state, they can be modified or reordered until they produce the database definition and data that you require. If required, a batch can be deleted and replaced with a different batch. This characteristic of being completely modifiable only occurs with batches and batch steps associated with level 0 when it is in the test state.

When a new test level is created from the existing production level, all the batches and batch steps in them are copied to the new test level. Within the new test level, the steps that were copied with the setup and cleanup batches are marked as production batch steps, and cannot be modified or reordered. It is possible, however, to append additional test batch steps to these batches.

The copied production batch steps in the test level of the setup and cleanup batches cannot be modified, meaning that the changes to the database definition and data on the test administered servers can only result from the new batch steps. The original batch steps are locked so that, if unexpected problems occur during the test phase, it will be much easier to identify and repair the problems that can occur. Changes cannot result from changes to the original batch steps, or from an interaction between changes in the original batch steps and the new batch steps.

The test batch steps can be modified until they provide the required results on the test administered servers: steps can even be removed. Because the test of the batch is isolated from the production administered servers, normal production is not affected.

The batch steps that were copied from the update batch of the production level are marked as test batch steps in the new level of the update batch. These batch steps can be modified in any way that you require.

A test level can be promoted to production. When the level is promoted to production, the batch steps of all batches are changed to the production state. Because the batch steps are in production, they are locked and cannot be modified. The batches and batch steps cannot be modified because you do not want untested changes introduced to the production administered servers.

Ordinarily, only production administered servers can execute production batch steps, and only test administered servers can execute test batch steps. An exception occurs if a new test administered server is introduced to the group. In this situation, the new test administered server has not yet executed any batches. When this administered server first synchronizes, it will execute all the batch steps in the batches of a test level, both production and test steps. In addition, a test administered server can be configured to execute all the batch steps of a test batch, including any production batch steps in it.

Obsolete batch steps only exist in the batches of an obsolete level. That is, obsolete batch steps cannot exist in either a test or a production level. Obsolete batch steps cannot be executed by any administered server.

How Administered Servers Execute Batch Steps

As a summary, a production level consists of group batches, the steps of which are in the production state, and are only executed by the production administered servers of the group. Given sufficient time, all the administered servers of the group will contact the administrative control server to synchronize, download the batch steps that they have to execute, and execute the associated scripts. Consequently, all the group administered servers begin at a consistent state, and end at a consistent state. If it is subsequently determinate that modifications to the database definition or data are required, you can create a new level of the application version. The new level will be in test state. You can then modify the setup, update and cleanup batches, as required, to make the modifications.

As previously described, when an update batch is copied to a new level, all the batch steps in the new level of the update batch are set to the test state. The new level of the update batch contains no production batch steps. As a result, the batch steps of an update batch can be modified in any way that is required. Batch steps can be changed, reordered, or new ones can be added, and existing ones deleted. When a test administered server synchronizes, it runs all the batch steps that are in the test state. By definition, the batch steps of the update batch are idempotent, and administered servers always execute all the batch steps of the update batch when they synchronize.

A test administered server executes the batch steps of a setup or cleanup batch differently than how it executes the batch steps of an update batch. When you create a test level of an application version from a production level, all the batch steps in the setup and cleanup batches are copied, but they remain at the production state. You cannot modify these production batch steps in any way, nor can you reorder or delete them. You can only append new test batch steps. Because the appended batch steps are in the test state, you can modify, reorder, or delete them.

The next time the test administered servers synchronize, the administrative control server will recognize that the test administered servers have not executed the new test batch steps. The test administered servers will only download and execute those test batch steps that they have not previously executed. A test administered server will not download and execute any of the production batch steps, unless that test administered server has not already executed the fill set of production batch steps. This situation can occur with a new test administered server.

Typically, the changes that the test batch steps implement should be verified on a small number of test administered servers before promoting the associated test level to production. If changes are required, the test batch steps can be modified or reordered, or new test steps could be added while existing steps could be deleted. The test process is iterative, allowing refinement of the test batch steps until desired results are achieved on the test administered servers. This process occurs without any impact to the production administered servers.

When the test steps achieve the desired results, the test level is promoted to production. The next time a production administered server synchronizes, it will download and execute the new batch steps in the setup and cleanup batches, and all of the batch steps in the update batch, whether they are changed or not. At this point, one cycle of the test-production cycle of batch step development has been completed.

The process and pseudocode for implementation of one embodiment of the invention are described below.

Pseudo code for PSTs
　De-parameterization Process
　Background:
　Each administered server will connect to its administrative control server to synchronize it's configuration and/or data with its group. All required changes to synchronize a given server with its group are coded in one or more scripts. When a server initiates the synchronization process, the following steps are executed:
　　1. administered server connects to its administrative control server
　　2. administrative control server identifies "scope" or "extent" of synchronization necessary for the administered server, thus selecting the appropriate synchronization script or scripts
　　3. all parameterized synchronization scripts are de-parameterized using the context of the synchronizing server, if necessary 4. Resultant synchronization scripts are downloaded to the administered server and executed to effect the changes required to synchronize configuration and/or data with its group
5. Results of synchronization are uploaded to administrative control server Step #3 is described below in detail in the form of pseudo code.

synchronization process (31), the following steps are executed:
administered server connects to its administrative control server (33);
administrative control server identifies "scope" or "extent" of synchronization necessary for the administered server (31), thus selecting the appropriate synchronization script or scripts (35); if any (36), (50);

Pseudo code:

```
for each ( synchronization script to be downloaded by synchronizing server ) do
{
    while ( a syntactically valid parameter marker exists in script )
    {
        extract a parameter marker using a depth-first search
        parse out components common to each parameter marker type, setting
        variables TableName and ColumnName
        if ( type of parameter marker is TABLE )
        {
            set variable WhereClausePredicates to the predicates component of the
            parameter marker
        }
        formulate the SQL query from the common parameter marker components:
            SELECT ColumnName FROM TableName
        if ( type of parameter marker is CONTEXTUAL ) then
        {
            append to query a where clause with predicates that uniquely identify
            synchronizing server:
                SELECT ColumnName FROM TableName WHERE <uniqueness predicate(s)>
        }
        else (type of parameter marker is TABLE )
        {
            append to query a where clause consisting of the specified predicates:
                SELECT ColumnName FROM TableName WHERE WhereClausePredicates
        }
        submit query to control database
        if ( no rows returned ) then
        {
            reject parameter marker as invalid
            discontinue deparameterizing the current script
            continue to next script by going to next iteration of the encompassing
            FOR EACH loop
        }
        else if ( more than one row returned ) then
        {
            select a single row according to an algorithm of choice
        }
        replace parameter marker in script with single value returned from query
    }
}
```

Figure 5A:
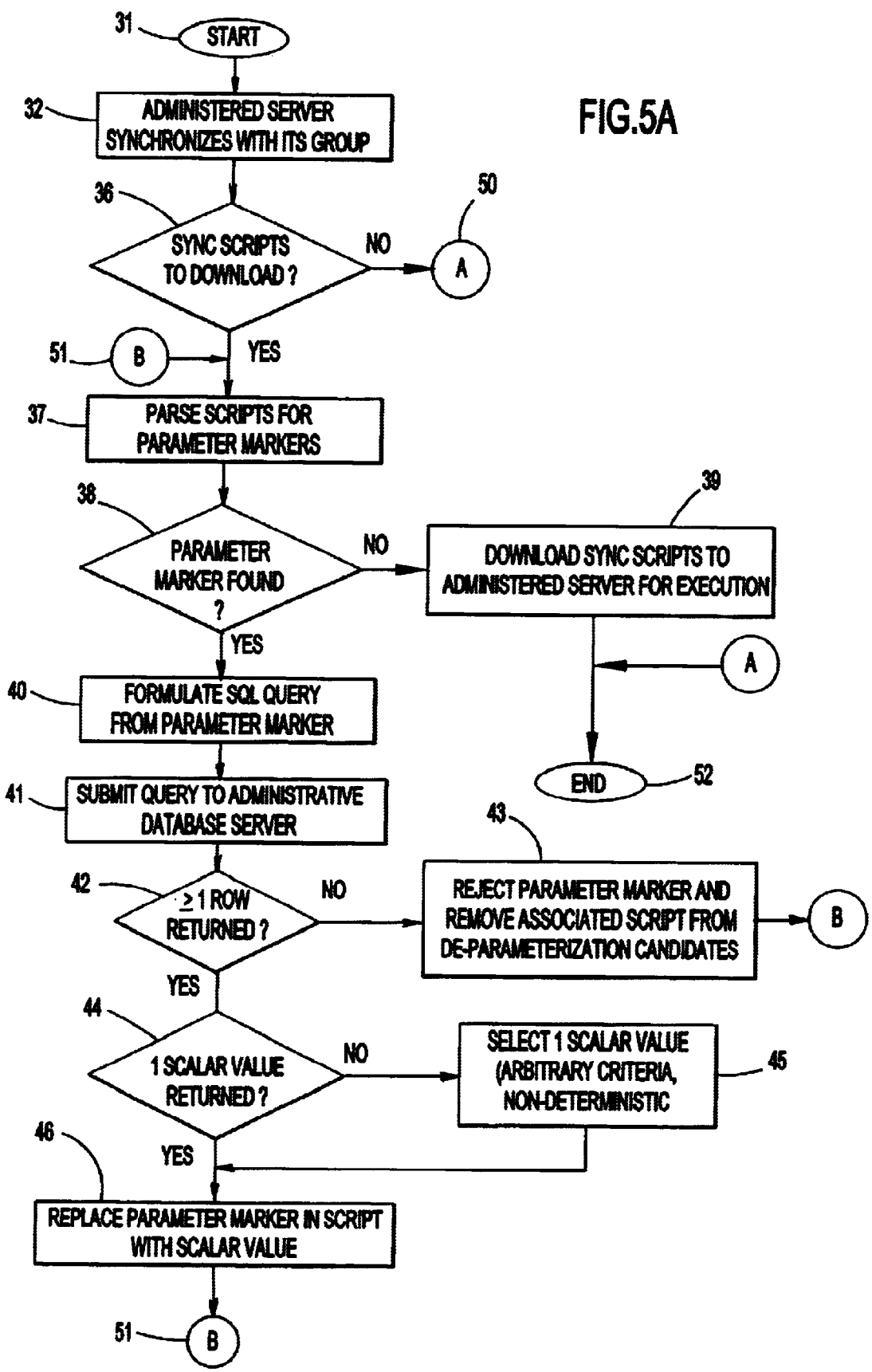
FIGS. 5A–5C illustrate the process flow of a preferred embodiment of the invention.
Figure 5B:
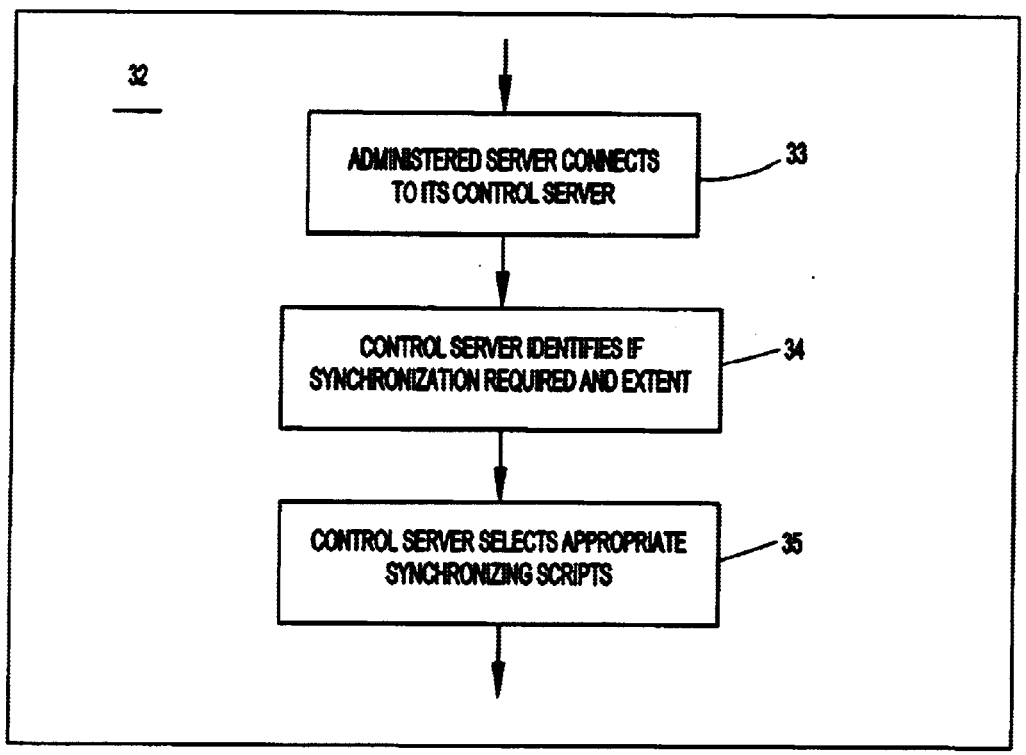
Figure 5C:
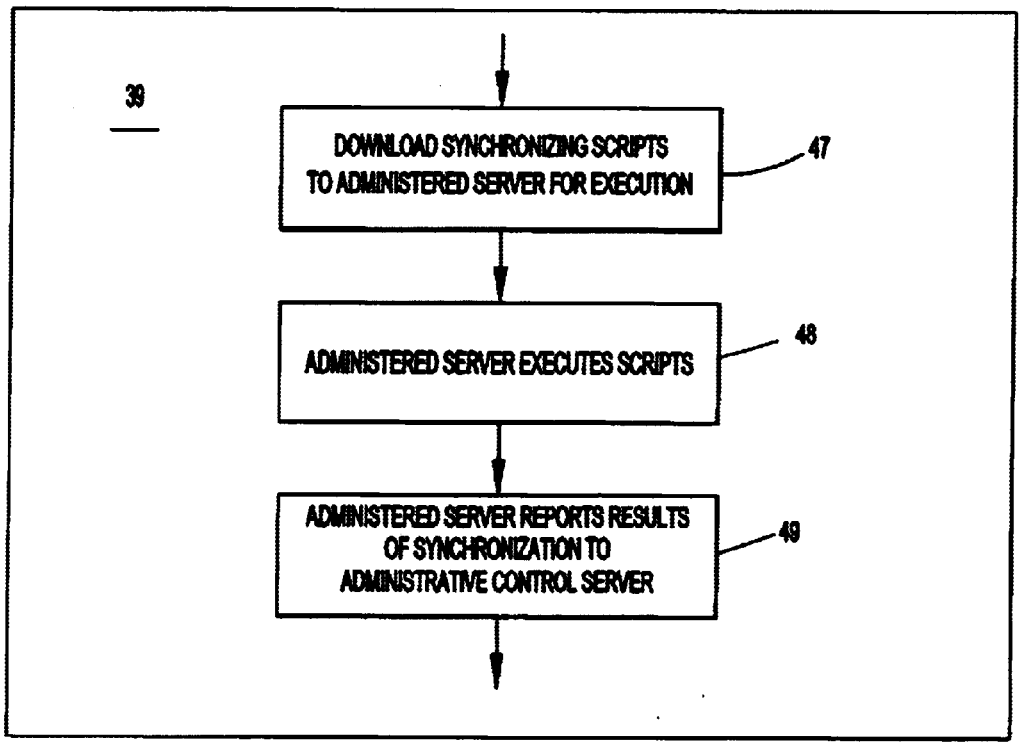

FIGS. 5A–5C depict one embodiment of the invention described above. Referring to FIG. 5A, the de-parameterization process may be appreciated. The numbers associated with each step in the process coincide with those of FIGS. 5A–5C.

Each administered server will connect to its administrative control server to synchronize it's configuration and/or data with its group (32). All required changes to synchronize a given administered server with its group are coded in one or more scripts. When an administered server initiates the all parameterized synchronization scripts are de-parameterized using the context of the synchronizing server, if necessary (see steps (37) to (46));
Resultant synchronization scripts are downloaded (47) to the administered server and executed (48) to effect the changes required to synchronize configuration and/or data with its group
results of synchronization are uploaded to administrative control server (49).

Steps (37) to (51) are described below in detail using the previous pseudo code.

```
for each ( synchronization script to be downloaded by synchronizing server, (36)
) do
{
    while ( a syntactically valid parameter marker exists in script )
```

-continued

```
{
   extract a parameter marker (37, 38) using a depth-first search
   parse out components common to each parameter marker type, setting
   variables TableName and ColumnName
   if ( type of parameter marker is TABLE )
   {
      set variable WhereClausePredicates to the predicates component of the
      parameter marker
   }
   formulate the SQL query from the common parameter marker components (40):
      SELECT ColumnName FROM TableName
   if ( type of parameter marker is CONTEXTUAL ) then
   {
      append to query a where clause with predicates that uniquely identify
      synchronizing server:
         SELECT ColumnName FROM TableName WHERE <uniqueness predicate(s)>
   }
   else (type of parameter marker is TABLE )
   {
      append to query a where clause consisting of the specified predicates:
         SELECT ColumnName FROM TableName WHERE WhereClausePredicates
   }
   submit query to administrative control database (41)
   if ( no rows returned ) then
   {
      reject parameter marker as invalid (43)
      discontinue deparameterizing the current script
      continue to next script by going to next iteration of the encompassing
      FOR EACH loop (51)
   }
   else if ( more than one row returned (42)) then
   {
      select a single row according to an algorithm of choice (44, 45)
   }
   replace parameter marker in script with single value returned from query
   (46)
   }
}
```

EXAMPLE

The following example illustrates the application of PSTs in a hypothetical situation:

Some Relational Control Tables in the Administrative Control Database in a Fictitious Administered Server Environment:

Fully Qualified table name: ADMIN.ADMINISTERED_SERVERS
Key Column: ID

| ID | GROUP | MACHINE_TYPE | ... |
|---|---|---|---|
| 'JWS' | 'southeast' | 47 | ... |
| 'bar' | 'southeast' | 47 | ... |
| ... | ... | ... | ... |
| 'tick' | 'northwest' | 49 | ... |
| ... | ... | ... | ... |

Fully-qualified table name: ADMIN.MACHINE_SETTINGS
Key Columns: MACHINE_TYPE, WORKLOAD

| MACHINE_TYPE | WORK-LOAD | MAXIMUM_CONNECTIONS | ... |
|---|---|---|---|
| 47 | 'LIGHT' | 100 | ... |
| 47 | 'MEDIUM' | 200 | ... |
| 47 | 'HEAVY' | 400 | ... |
| 49 | 'LIGHT' | 150 | ... |
| 49 | 'MEDIUM' | 250 | ... |
| 49 | 'HEAVY' | 500 | ... |
| ... | ... | ... | ... |

Fully Qualified table name:
ADMIN.DATABASE_MANAGER_CONFIG_PARMS
Key Column: GROUP

| GROUP | DIAGNOSTIC_REPORT_LEVEL | ... |
|---|---|---|
| 'southeast' | 1 | ... |
| 'northwest' | 2 | ... |
| ... | ... | ... |

Sample Synchronization PST Use for Setup:
Note: This is a hypothetical example using a fictitious script language solely for the purpose of illustration of concept.

UPDATE DATABASE MANAGER CONFIGURATION
   SET MAX_INBOUND_CONNECTIONS=
      {{ADMIN.MACHINE_SETTINGS:
      MAXIMUM_CONNECTIONS: MACHINE_
      TYPE=
      {{ADMIN.ADMINISTERED_MACHINES:
         MACHINE_TYPE}} AND WORKLOAD=
         'LIGHT'}},
   SET          DIAGNOSTIC_LEVEL=
      {{ADMIN.DATABASE_MANAGER_CONFIG_
      PARMS:
      DIAGNOSTIC_REPORT_LEVEL: GROUP=
         {{ADMIN.ADMINISTERED_MACHINES:
         GROUP}}}};

Execution of Algorithm Using Sample Synchronization PST:
Assume administered server with unique ID='JWS' synchronizes with its administrative control server. The relevant portions of the administrative control servers control data is given above in the three control tables.

In this sample execution, the inputs and outputs of each iteration of the process o the invention is displayed.

Iteration #1
Input PST:
UPDATE DATABASE MANAGER CONFIGURATION
  SET MAX_INBOUND_CONNECTIONS=
    {{ADMIN.MACHINE_SETTINGS:
    MAXIMUM_CONNECTIONS: MACHINE_
    TYPE=
      {{ADMIN.ADMINISTERED_MACHINES:
        MACHINE_TYPE}} AND WORKLOAD=
        'LIGHT'}},
    SET             DIAGNOSTIC_LEVEL=
      {{ADMIN.DATABASE_MANAGER_CONFIG_
      PARMS:
      DIAGNOSTIC_REPORT_LEVEL: GROUP=
        {{ADMIN.ADMINISTERED_MACHINES:
          GROUP}}}};
Parameter Marker Extracted:
  {{ADMIN.ADMINISTERED_MACHINES:
    MACHINE_TYPE)}}
Value Retrieved From Control Tables to be Substituted for Parameter Marker
  47
Output Script:
UPDATE DATABASE MANAGER CONFIGURATION
  SET MAX_INBOUND CONNECTIONS=
    {{ADMIN.MACHINE_SETTINGS:
    MAXIMUM_CONNECTIONS: MACHINE_
    TYPE=47
AND WORKLOAD='LIGHT'}},
    SET             DIAGNOSTIC_LEVEL=
      {{ADMIN.DATABASE_MANAGER_CONFIG_
      PARMS: DIAGNOSTIC_REPORT_LEVEL:
      GROUP=
        {{ADMIN.ADMINISTERED_MACHINES:
          GROUP}}}};
Iteration #2
Input PST:
UPDATE DATABASE MANAGER CONFIGURATION
  SET MAX_INBOUND_CONNECTIONS=
    {{ADMIN.MACHINE_SETTINGS:
    MAXIMUM_CONNECTIONS: MACHINE_
    TYPE=47
    AND WORKLOAD='LIGHT'}},
    SET             DIAGNOSTIC_LEVEL=
      {{ADMIN.DATABASE_MANAGER_CONFIG_
      PARMS:
      DIAGNOSTIC_REPORT_LEVEL: GROUP=
        {{ADMIN.ADMINISTERED_MACHINES:
          GROUP}}}};
Parameter Marker Extracted:
  {{ADMIN.MACHINE_SETTINGS: MAXIMUM_
    CONNECTIONS: MACHINE_TYPE=47 AND
    WORKLOAD='LIGHT'}};
Value Retrieved From Control Tables to be Substituted for Parameter Marker
  100
Output Script:
UPDATE DATABASE MANAGER CONFIGURATION
  SET MAX_INBOUND_CONNECTIONS=100,
  SET             DIAGNOSTIC_LEVEL=
    {{ADMIN.DATABASE_MANAGER_CONFIG_
    PARMS:
    DIAGNOSTIC_REPORT_LEVEL: GROUP=
      {{ADMIN.ADMINISTERED_MACHINES:
        GROUP}}}};
Iteration #3
Input PST:
UPDATE DATABASE MANAGER CONFIGURATION
  SET MAX_INBOUND_CONNECTIONS=100,
  SET             DIAGNOSTIC_LEVEL=
    {{ADMIN.DATABASE_MANAGER_CONFIG_
    PARMS:
    DIAGNOSTIC_REPORT_LEVEL: GROUP=
      {{ADMIN.ADMINISTERED_MACHINES:
        GROUP}}}};
Parameter Marker Extracted:
  {{ADMIN.ADMINISTERED_MACHINES: GROUP}}
Value Retrieved From Control Tables to be Substituted for Parameter Marker
  'southeast'
Output Script:
UPDATE DATABASE MANAGER CONFIGURATION
  SET MAX_INBOUND CONNECTIONS=100,
  SET             DIAGNOSTIC_LEVEL=
    {{ADMIN.DATABASE_MANAGER_CONFIG_
    PARMS:
    DIAGNOSTIC_REPORT_LEVEL: GROUP=
      'southeast'}};
Iteration #4
Input PST:
UPDATE DATABASE MANAGER CONFIGURATION
  SET MAX_INBOUND_CONNECTIONS=100,
  SET             DIAGNOSTIC_LEVEL=
    {{ADMIN.DATABASE_MANAGER_CONFIG_
    PARMS:
    DIAGNOSTIC_REPORT_LEVEL: GROUP=
      'southeast'}};
Parameter Marker Extracted:
  {{ADMIN.DATABASE_MANAGER_CONFIG_
    PARMS: DIAGNOSTIC_REPORT_LEVEL:
    GROUP='southeast'}}
Value Retrieved From Control Tables to be Substituted for Parameter Marker
  1
Output Script:
UPDATE DATABASE MANAGER CONFIGURATION
  SET MAX_INBOUND_CONNECTIONS=100,
  SET DIAGNOSTIC_LEVEL=1;

The embodiments of the invention in which an exclusive property or privilege is claimed are defined as follows:

1. A data processing system comprising:
  an administrative control server;
  an administrative control database, connected to said administrative control server; and
  at least one group of servers comprising a plurality of administered servers having similar configurations and being adapted for communication with said administrative control server for administrative control thereby;
  wherein said control server comprises configuration synchronization means to change the configurations of said administered servers to a new desired configuration for each administered server where said new configuration is in synchronization with the configuration of each other of said administered servers.

2. The data processing system of claim 1 wherein said configuration synchronization means of said administrative control server comprises synchronization control means adapted to identify the configuration of each administered server in communication with said administrative control server and is adapted to send synchronization instructions to each said administered server to change its configuration to a new desired configuration into synchronization with other administered servers of said group.

3. The data processing system of claim 2 wherein configuration information is stored in said administrative control database and said synchronization control means is adapted to send synchronization instructions to each said administered server using said configuration information Stored in said database to change the configuration of each said administered server to a new desired configuration into synchronization with other administered servers of said group.

4. The data processing system of claim 3 wherein said configurations information comprises synchronization scripts that are used to change the configuration of said administered servers.

5. The data processing system of claim 3 wherein said configuration information comprises synchronization scripts that are used to change the configuration of said administered servers; said synchronization scripts comprising parameterized scripts adapted to accommodate differences in said administered servers, said administrative control server de-parameterizing said parameterized scripts to produce said synchronization instructions for said administered server.

6. The data processing system of claim 5 wherein said configuration information comprises synchronization scripts that are used to change the configuration of said administered servers; said synchronization scripts comprising parameterized scripts and non-parameterized scripts in which said parameterized scripts are adapted to accommodate specified differences in said administered servers, and said non-parameterized scripts are adapted for use to accommodate characteristics of said administered servers that are not determinative of the outcome of administrative actions by said administrative control server.

7. In a data processing system comprising an administrative controller; an administrative control database containing configuration information for administered servers, connected to said administrative controller; and at least one group of administered servers having similar configurations with each other, and being adapted for communication with said administrative controller for administrative control thereby; said controller having configuration synchronization means to change the configurations of said administered servers to a new desired configuration for each administered server where said new configuration is in synchronization with the configuration of each of said other administered servers; a method of controlling administration of said data processing system comprising the following steps:

connecting an administered server to said administrative controller;

causing said administrative controller to determine the configuration state of said administered server; and causing said administrative controller to send one or more synchronization instructions, using configuration information from said administrative control database, to said administered server to cause said administered server to change its configuration from its current configuration to a new configuration in synchronization with the new configuration indicated by said synchronization instructions, and in synchronization with other similarly configured administered servers.

8. The method of claim 7 wherein the method of synchronization is performed for each administered server connected to said data processing system.

9. The method of claim 8 wherein said configuration information comprises synchronization scripts stored in said administrative control database that are used by said administrative controller to generate synchronization instructions to be sent to said administered servers to change the configuration of said administered servers.

10. The method of claim 9 wherein said synchronization scripts are selected by said administrative controller based on the configuration sent to said controller from said administered server and configuration information for the new configuration desired for said administered server.

11. The method of claim 10 wherein said configuration information comprises synchronization scripts including parameterized scripts in which said parameterized scripts are adapted to accommodate specified differences in said administered servers; including the following steps:

said administrative server de-parameterizes said parameterized scripts to produce said synchronization instructions for said administered server; and, said administrative controller sends said synchronization instructions to said administered servers to change the configuration of said administered servers to the desired configuration.

12. The method of claim 11 wherein said configuration information comprises synchronization scripts that are used to change the configuration of said administered servers; said synchronization scripts comprising parameterized scripts and non-parameterized scripts in which said parameterized scripts are adapted to accommodate specified differences in said administered servers, and said non-parameterized scripts are adapted for use to accommodate characteristics of said administered servers that are not determinative of the outcome of administrative actions by said administrative controller wherein said administrative controller produces synchronization instructions for said administered servers from said non-parameterized and from said parameterized scripts.

13. The method of claim 11 wherein each said administered server to which said synchronization instructions are sent executes said synchronization instructions to effect required changes to synchronize configuration and or data with similar administered servers in said data processing system.

14. The method of claim 13 wherein each said administered server which has executed said synchronization instructions sends execution results information of the execution of said synchronization instructions to said administrative controller.

15. The method of claim 14 wherein each said administered server disconnects from said administrative controller after sending said results information.

16. A method of synchronization of similarly configured administered servers from a current configuration to a predetermined configuration by an administrative control server having an administrative control database in a data processing system comprising the following steps:

connecting an administered server to said administrative control server;

causing said administrative control server to identify said administered server's configuration;

causing said administrative control server to select at least one or more synchronization scripts from said administrative control database for the purpose of changing the configuration of said administered server from its current configuration to said predetermined configuration;

causing said administrative control server to process said at least one or more synchronization scripts to produce at least one synchronization instruction for said administered server to change its configuration;

causing said administrative control server to send said at least one synchronization instruction to said administered server;

causing said administered server to execute said at least one synchronization instruction to change its configuration to said predetermined configuration; and, causing said administered server to notify said administrative control server of said change of configuration.

17. The method of claim 16 wherein said synchronization scripts comprise parameterized synchronization scripts adapted to produce appropriate changes of configuration in said administered servers and said method includes the step of causing said administered server to de-parameterize said parameterized scripts using the context of said administered server to produce said synchronization instruction.

18. A computer program product comprising storage means and instructions stored thereon when operated in a data processing system, including an administrative controller with control database containing configuration information for administered servers, connected to said administrative controller; and at least one group of administered servers having similar configurations with each other, and being adapted for communication with said administrative controller for administrative control thereby; said controller having configuration synchronization means to change the configurations of said administered servers to a new desired configuration for each administered server where said new configuration is in synchronization with the configuration of each of said other administered servers, for executing a method of controlling administration of said data processing system comprising the following steps:

connecting an administered server to said administrative controller;

causing said administrative controller to determine the configuration state of said administered server; and causing said administrative controller to send one or more synchronization instructions, using configuration information from said administrative control database, to said administered server to cause said administered server to change its configuration from its current configuration to a new configuration in synchronization with the new configuration indicated by said synchronization instructions, and in synchronization with other similarly configured administered servers.

19. A computer program product comprising storage means and instructions stored thereon for obtaining synchronization of similarly configured servers (administered servers) from a current configuration to a predetermined configuration by an administrative control server having an administrative control database in a data processing system comprising program routines executable by a data processing system to:

connect an administered server to said administrative control server;

cause said administrative control server to identify said administered server's configuration;

cause said administrative control server to select at least one or more synchronization scripts from said administrative control database for the purpose of changing the configuration of said administered server from its current configuration to said predetermined configuration;

cause said administrative control server to process said synchronization scripts to produce at least one synchronization instruction for said administered server to change its configuration;

cause said administrative control server to send said at least one synchronization instruction to said administered server;

cause said administered server to execute said at least one synchronization instruction to change its configuration to said predetermined configuration; and, cause said administered server to notify said administrative control server of said change of configuration.

* * * * *